United States Patent
Campbell

(10) Patent No.: US 12,503,036 B2
(45) Date of Patent: Dec. 23, 2025

(54) CABLE AND LOCK FOR SECURING CARGO IN VEHICLES WITH A LOCKING TOOLBOX

(71) Applicant: 8th Commandment Cable Company, LLC, Vicksburg, MS (US)

(72) Inventor: Joseph Lane Campbell, Vicksburg, MS (US)

(73) Assignee: 8th Commandment Cable Company, LLC, Vicksburg, MS (US)

( * ) Notice: Subject to any disclaimer, the term of this patent is extended or adjusted under 35 U.S.C. 154(b) by 761 days.

(21) Appl. No.: 17/699,703

(22) Filed: Mar. 21, 2022

(65) Prior Publication Data

US 2022/0305979 A1    Sep. 29, 2022

Related U.S. Application Data

(60) Provisional application No. 63/164,810, filed on Mar. 23, 2021.

(51) Int. Cl.
*B60P 7/08* (2006.01)
*B60R 9/06* (2006.01)

(52) U.S. Cl.
CPC ............ *B60P 7/0807* (2013.01); *B60R 9/065* (2013.01)

(58) Field of Classification Search
CPC ....... B60P 7/0807; B60P 7/0823; B60P 7/083; B60R 9/065; B60R 9/048; B62D 33/023
USPC ........................................................ 410/106
See application file for complete search history.

(56) References Cited

U.S. PATENT DOCUMENTS

| | | | |
|---|---|---|---|
| 5,011,349 A | 4/1991 | McAndrews | |
| 5,768,920 A | 6/1998 | DeBevoise | |
| 5,887,840 A | 3/1999 | Hoffman | |
| 6,079,679 A * | 6/2000 | Mitchell | B60R 11/00 |
| | | | 248/301 |
| 6,155,622 A | 12/2000 | Reed | |
| 6,604,390 B1 | 8/2003 | Nooner | |
| 7,186,914 B1 | 3/2007 | Knight | |
| 7,229,116 B1 | 6/2007 | Bruford et al. | |
| 7,428,833 B2 | 9/2008 | Tollefson | |
| 7,488,021 B1 | 2/2009 | Roos et al. | |
| 10,518,693 B2 | 12/2019 | Moua et al. | |
| 11,104,262 B2 * | 8/2021 | Campbell | B60P 7/0823 |
| 2003/0127873 A1 | 7/2003 | Reed | |
| 2009/0309381 A1 | 12/2009 | Nelson | |
| 2012/0263552 A1 | 10/2012 | Hooton | |
| 2012/0292360 A1 | 11/2012 | O' Regan et al. | |
| 2013/0094930 A1 | 4/2013 | Kalergis et al. | |
| 2017/0113595 A1 | 4/2017 | Hemphill | |
| 2017/0361756 A1 | 12/2017 | Marchlewski et al. | |
| 2018/0118280 A1 | 5/2018 | Marchlewski et al. | |

(Continued)

*Primary Examiner* — Amy R Weisberg
(74) *Attorney, Agent, or Firm* — Dawn-Marie Bey; Bey & Cotropia PLLC

(57) ABSTRACT

The vehicle for use with the present system is a pickup truck or other work truck with an open cargo space. Locking toolbox(es) may be mounted anywhere within the bed, but customarily down the bed rails or across the width of the bed. The toolbox(es) have locking latches when the toolbox is closed. When the lid of the toolbox is closed, then the lid of the toolbox can be locked in this position securing its contents inside. A fixed or retractable cable strap, chain, rope, or similar line is adapted to be locked together with the locking of the lid of the mounted toolbox.

13 Claims, 19 Drawing Sheets

(56) References Cited

U.S. PATENT DOCUMENTS

| | | |
|---|---|---|
| 2018/0147976 A1 | 5/2018 | Stojkovic et al. |
| 2019/0100128 A1 | 4/2019 | Williams et al. |
| 2019/0143934 A1 | 5/2019 | Tackett |
| 2019/0210507 A1 | 7/2019 | Reiners et al. |
| 2019/0210509 A1 | 7/2019 | Hemphill et al. |
| 2019/0210510 A1* | 7/2019 | Campbell ............... B60P 7/08 |
| 2019/0225137 A1 | 7/2019 | Williams et al. |
| 2019/0337441 A1 | 11/2019 | Marchlewski et al. |
| 2020/0062167 A1* | 2/2020 | Campbell ............ B60P 7/0807 |
| 2021/0031670 A1 | 2/2021 | Andersson |

\* cited by examiner

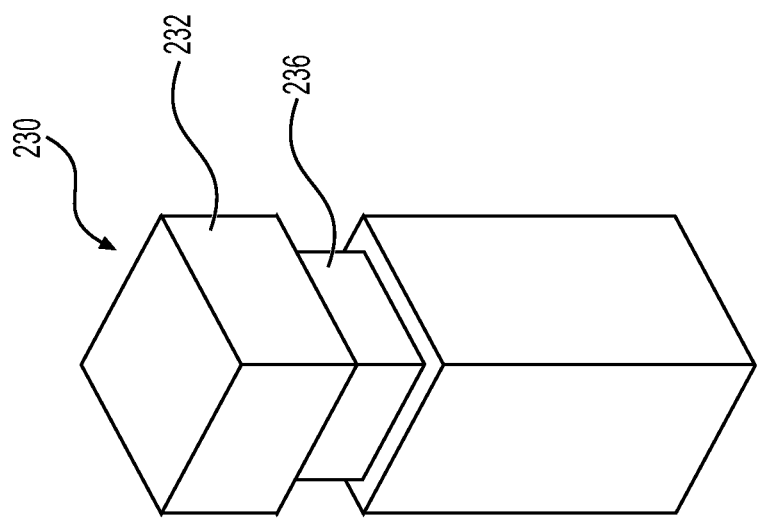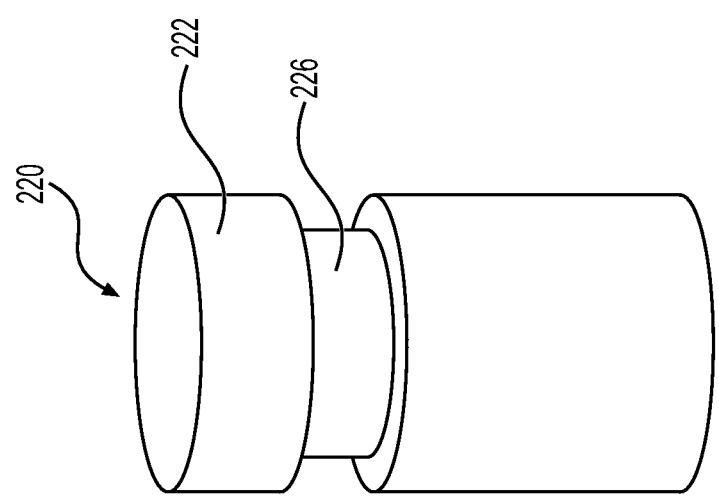
FIG. 17 ated therein. A contoured key has
CABLE AND LOCK FOR SECURING CARGO IN VEHICLES WITH A LOCKING TOOLBOX The present application claims the benefit of filing of U.S. Provisional Patent Application 63/164,810, filed Mar. 23, 2021, entitled Cable and Lock for Securing Cargo in Vehicles with a Locking Toolbox, which is incorporated by reference herein in its entirety.

The present invention is directed to the use of a cable, strap, chain, rope, or similar line together with a locking key for use in securing cargo in a vehicle cargo bed through the use of the closing of a lid of an in-bed mounted tool box.

BACKGROUND

Some vehicles like utility vehicles, pickup trucks and work trucks most often have open cargo beds. These cargo beds enable easy access for loading and unloading many different items. This easy and open accessibility, however, has its problems. Specifically, items placed in an open cargo bed are easy targets for theft. More generally, unsecured cargo can be blown from the bed area of a vehicle at speed.

Several well-known countermeasures are available to help prevent theft. The first solution is the classic in-bed locking toolbox that can be mounted across a bed or down one or both sides of a bed. In-bed mounted toolboxes are effective anti-theft devices, but they take up a large amount of valuable cargo space. A second answer is a cargo bed cover, that has an additional benefit of being a weather protector to items placed on the cargo bed. These bed covers, however, are expensive and often easy to breach, they limit the height of the cargo that may be transported, and they are bulky and can take up considerable space in the cargo bed. Finally, there are many cargo-specific devices such as for instance bicycle carriers and motor cycle carriers that can be mounted in a bed and used. Again, these are bulky and can be difficult to handle.

SUMMARY

Accordingly, it is an object to overcome the shortcomings of existing devices that help protect items from theft by providing a fixed or retractable cable strap, chain, rope, or similar line together with a key that is adapted to be locked and secured by the closing and the locking of a toolbox mounted to the vehicle.

In one example, a cable locking system for use with vehicles having a mounted toolbox comprises a vehicle having a cargo bed, wherein the cargo bed has a toolbox mounted on one end of the cargo bed and a length of cable that has a first end of the cable and a second end of the cable. A lug is fixed onto the first end of the cable having a groove across its width and an end block having a diameter greater than a diameter of the groove. A contoured key has an open slot that is sized to slide across the lug groove and wherein the lug block is too large to come out of the slot; and further wherein the contoured key fits into the empty space between the closed toolbox lid and the body of the toolbox that it is attached to whereby a cable may be pulled from the cable spool and the lug may be inserted into the key so that the key and lug are locked when the toolbox is closed. The cable spool may be fixed inside the toolbox or underneath the floor of the cargo bed. The lug may be round or rectangular in cross-section. The open slot of the contoured key may be positioned in a first end of the contoured key, and a second end of the contoured key opposite the first end wherein the contoured key has an S-shape as defined by two 180 degree turns. The second end of the contoured key may be fixed to the body of the toolbox face by compression form tightening a bolt to the inside face of the tool box.

In another example, a cable locking system for use with vehicles having a mounted locking toolbox comprises a vehicle having a cargo bed, wherein the cargo bed has a toolbox mounted on one end of the cargo bed and the toolbox having rotating open down and up latched positions and the toolbox rotates into the latched position when the toolbox is closed. A length of cable has a first end of the cable and a second end of the cable that is fixed to the cargo bed. A lug is fixed onto the first end of the cable having a groove across its width and an end block having a diameter greater than a diameter of the groove. A contoured key has an open slot that is open to the distal end of a first end of the key, and the slot is sized to slide across the lug groove and wherein the lug block is too large to come out of the slot; and further wherein the contoured key fits into the empty space between the closed toolbox lid and the toolbox body that it is attached to.

BRIEF DESCRIPTION OF THE DRAWINGS

FIG. 17 illustrates perspective views of examples of alternative shapes for the lugs described herein.

DETAILED DESCRIPTION

Figure 1:
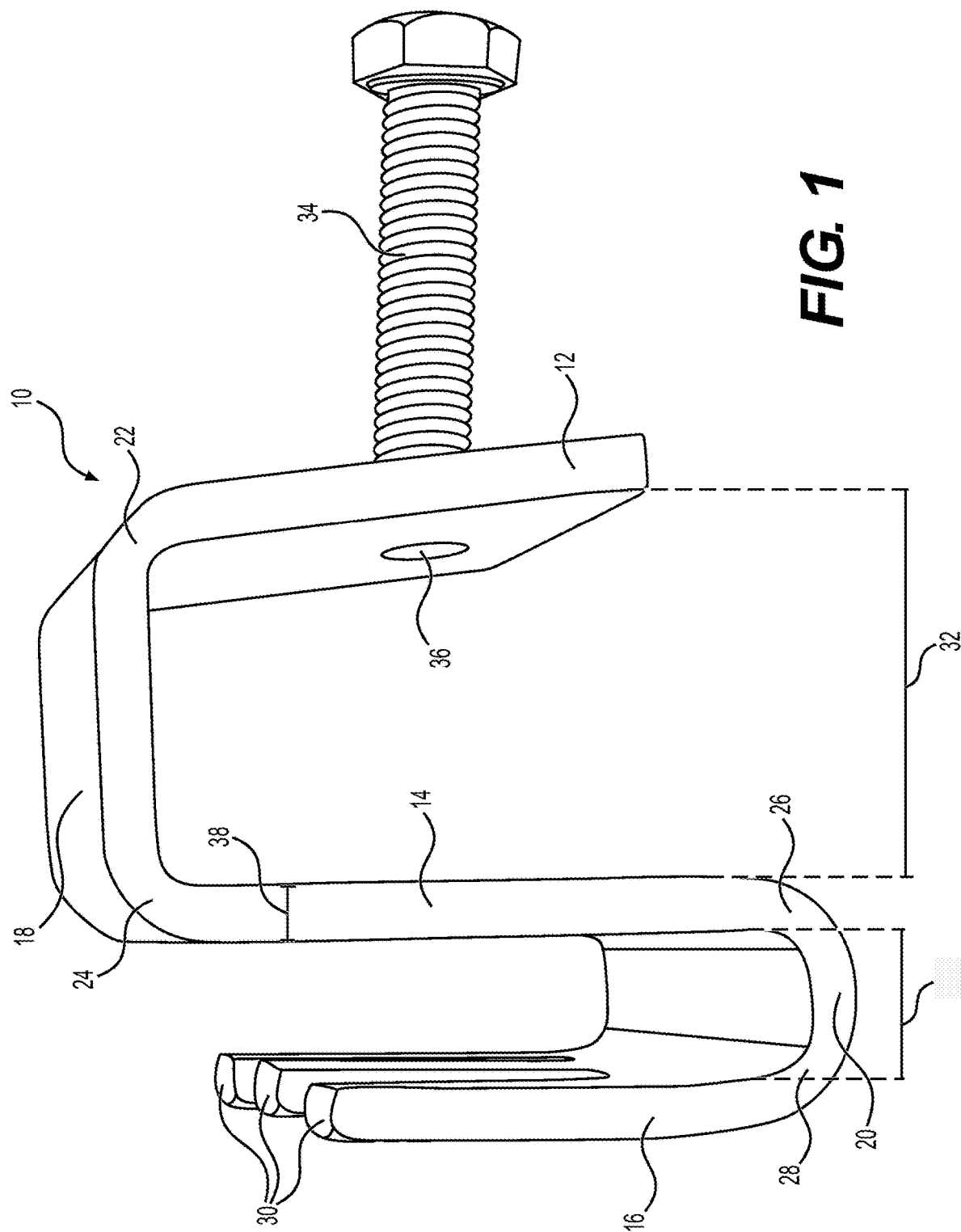
FIG. 1 is a side perspective view of a key as described herein.

Some vehicles, especially many modern pickup trucks, similar work trucks, utility vehicles, and all-terrain vehicles have lockable toolboxes mounted on the vehicle. The present securing systems take advantage of a locking toolbox so that the process of locking the toolbox will also lock a retractable locking cable, or similar line device that may secure cargo in the cargo bed of the vehicle. The system uses a retractable or fixed spool of cable where the cable can be unwound and used as a locking device, or the cable can be retracted and substantially out of a work space in the truck cargo bed or within the toolbox itself.

The vehicle for use with the present system is a pickup truck or other similar work truck or utility vehicle with an open cargo space. As noted earlier, easy access to a cargo bed means easy use but also easy mischief for a thief or vandal. Further, items in the cargo bed are susceptible to simply being blown out of the cargo area of a vehicle at speed. A toolbox is typically defined by a rectangular bed surrounded by fixed walls on four (4) sides and a lid on top for access by hinges in the rear and locking latch in the front. The front face of the toolbox is referred to as the front body or front toolbox body. The top of the toolbox is rotatably connected to the top of the toolbox by hinges mounted on the top of the rear of the toolbox. When the toolbox is open or in the up position, it is typically approximately perpendicular to the toolbox floor and the cargo bed floor. When the toolbox is down or in its closed position, it is approximately parallel to the floor of the toolbox and cargo bed floor. In this down and closed position, the toolbox is latched or locked to the front toolbox body.

The spool is a retractable reel of flexible and strong cable. The spool may have different lengths of cable wound up therein. The cable may alternatively be simply fixed to a bed and carried loosely in the toolbox or bed. For the purposes of the present system, there is typically about 6 to 30 or more feet of cable, or alternatively about 12 to 25 feet of cable. The cable may be formed of a coated steel or other metal braid or other flexible material. The cable can have a cross-sectional thickness of about one-eighth to one-half of an inch or other thickness as appropriate for the flexible cable. In addition to a spool of cable, a chain may alternatively be used. The chain may be stored loosely in the cargo bed, inside the toolbox, or it may also be wound into a spool. A combination of chain and cable may be used, for instance, as a long chain with a short cable leader on its end, or vice versa.

A lug is fixed to the end of the cable that may be retracted from the spool in the example of a retractable spool. The opposite end of the cable from the lug is fixed to the inside of the spool. Alternatively, the opposite end of the cable is secured to the bed or some box or cabinet otherwise secured to the bed. The lug is a rigid piece with a groove around its circumference in a middle portion of the lug. Alternatively, the groove is across a middle portion of the lug in a direction that is substantially perpendicular the linear length of the lug. There may be parallel grooves on opposite sides of the lug across the middle portion of the lug. It is only operationally important that the distal end of the lug is a block portion that is wider than the groove diameter. The cross section of the lug may be round in most examples, but it may also be square or hexagonal or some other symmetrical or asymmetrical geometry. The lug is typically formed of steel or aluminum or other rigid metal, but it may also be formed of a strong polymer or composite material. The lug may have a longitudinal length of about 1 to 4 inches, or alternatively about 2 to 3 inches.

A locking mechanism in the form of a contoured key is a flat and metallic piece with an open slot in a first end of the key. This slot is sized to be larger in width than the groove of the cable lug but smaller in width than the block end of the lug. In this way, the lug, once slid into the groove of the key, is secured in the groove and cannot be removed in the direction perpendicular to the groove. The second end of the key on the opposite end from the first end is adapted to be secured between the toolbox body and the toolbox lid when the toolbox is closed. It is believed that virtually all toolboxes have a small gap between the toolbox lid and the toolbox body with an overhang by the larger lid to prevent water penetration and add rigidity to the lid after it is closed. In order to be secure between the toolbox lid and toolbox body, the second end of the key is contoured to be able to be secured when the toolbox is closed. To accomplish this, the second end of the key will have at least four approximately 90 degree turns (or two approximately 180 degree turns) in it to form a zig-zag or S-shape. Additional turns are optional and may be used to contour with a specific toolbox model. The 90 degree turns correspond to the edges of the contour of the toolbox body. With four 90 degree turns, the second end of the key is wedged into place between key and the toolbox lid and cannot be simply pulled out. Thus, the lug is secure in the first end of the key and the key is secure between the toolbox lid and the toolbox body.

There are multiple options to configure the key and cable lug so that the lug is locked into the key when the toolbox is closed. In each case, the second end of the key has the zig-zag or S-shape so that the key is secured upon closing of a toolbox lid. The system works with the contour of the space between the closed toolbox lid and the toolbox body. This space can be utilized by creating a key with the face of the key that contacts the front toolbox body to lie flat against the contours of the toolbox body and filling the empty space between the closed toolbox lid and the toolbox body. This will compress the key in place when the toolbox is closed and cannot be removed without opening the toolbox lid. The key itself must be precisely machined to follow the contour of the toolbox body. A rugged steel plate, in one example 16-gauge steel, will fit in the gap between the closed toolbox lid and toolbox body. The throat of the key must be slightly wider than the thickness of a link in the chain or slightly thicker than the inside diameter of the groove machined into the lug. The face of the key touching the toolbox body may be held in place by compression of a threaded bolt through the inside face of the key contacting the inside body of the toolbox thereby pulling the outside face of the key flush against the outside of the front face of the toolbox. The outside or flat faces of the key may have rubber pads adhered to them to aid in compression and to prevent metal on metal contact when the key is compressed by the closing toolbox. The contour of the toolbox body is different in thickness of the front toolbox body by manufacturer of the toolbox. The key has been made such that the threaded bolt can tighten the key against the varying widths of the toolbox body.

The first end of the key may have two or more throats (also referred to as slots) therein to receive multiple lugs or chain to lock therein. In the example of two slots, there may be one end of two different cables or chains able to be secured therein. However, it is also possible to secure both ends of the same cable in one key having two slots therein.

The second end of the key may alternatively be secured to the toolbox to reinforce the security of the key in the gap between the toolbox lid and toolbox body when closed. The second end can be bolted or screwed to the toolbox. The second end can be fixed by adhesive or a magnet to the toolbox, of course in the instance of a steel toolbox, or by welding or soldering. Specific examples, without limitation, of key and lug combinations are disclosed in the figures herein.

In one example, the system itself has three main components: 1) a cable or chain or like material; 2) the shape of the lug at the end of the cable or the diameter of the link of chain, and 3) the structure of the toolbox body and lid along with the functioning of the toolbox and its locking system. In the example of a round cross section lug, the orientation of the lug is irrelevant as it is radially symmetrical. However, alternatively, the lug may have a square or star or hexagonal or other geometric shape that has at least two parallel sides and the groove machined therein to receive the key slot or throat. When the lug has a different cross section shape, it is only important that its largest outside diameter is still able to be inserted into the slot of the key.

If a chain is used, then the inside diameter of the chain must be slightly less than the width of the body of the key making up the slots. A link or links of the chain are placed on the vertical portions of the throat. The link can then be bound by the key by penetrating the link with the vertical facing body of the key's slots. Therefore, the body of the key making up the slot or throat of the key must be slightly thinner than the inside diameter of the link The spool can be fixed in any one of multiple positions around the vehicle cargo bed or inside the toolbox. The spool may be anchored underneath the cargo bed floor adjacent a hole drilled through or formed in the floor from which the lug and cable can be unwound inside the cargo space. The cargo bed may have one or more toolboxes mounted therein. The spool may be fixed inside a tool box and proximate a hole in the tool box through which the lug and cable may be unwound into the open bed. And, there may be more than one spool mounted around a vehicle cargo bed so that the cable is near a strategic spot for use.

Figure 2:
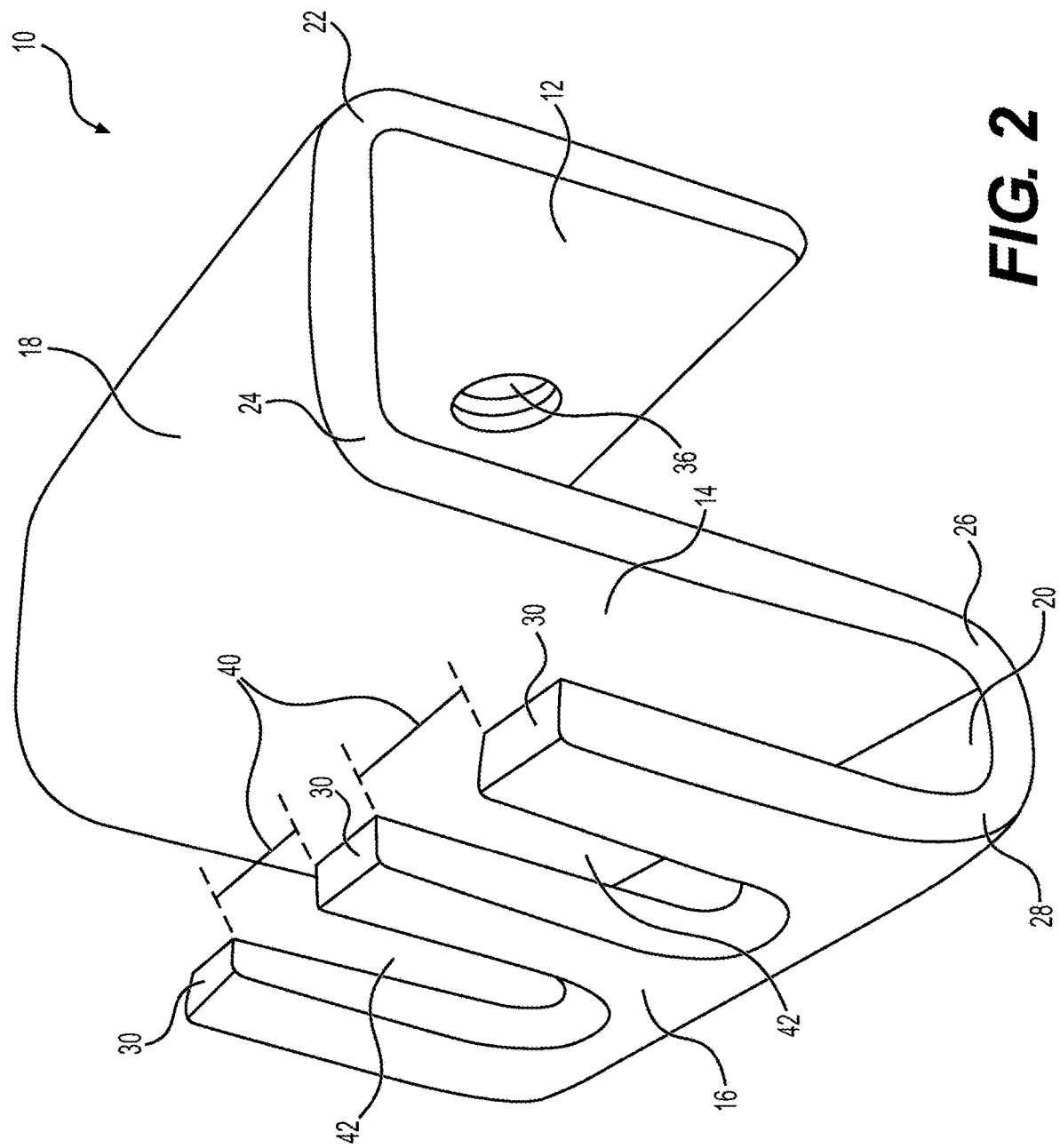
FIG. 2 is a front and side perspective of the key shown in FIG. 1.
Figure 3:
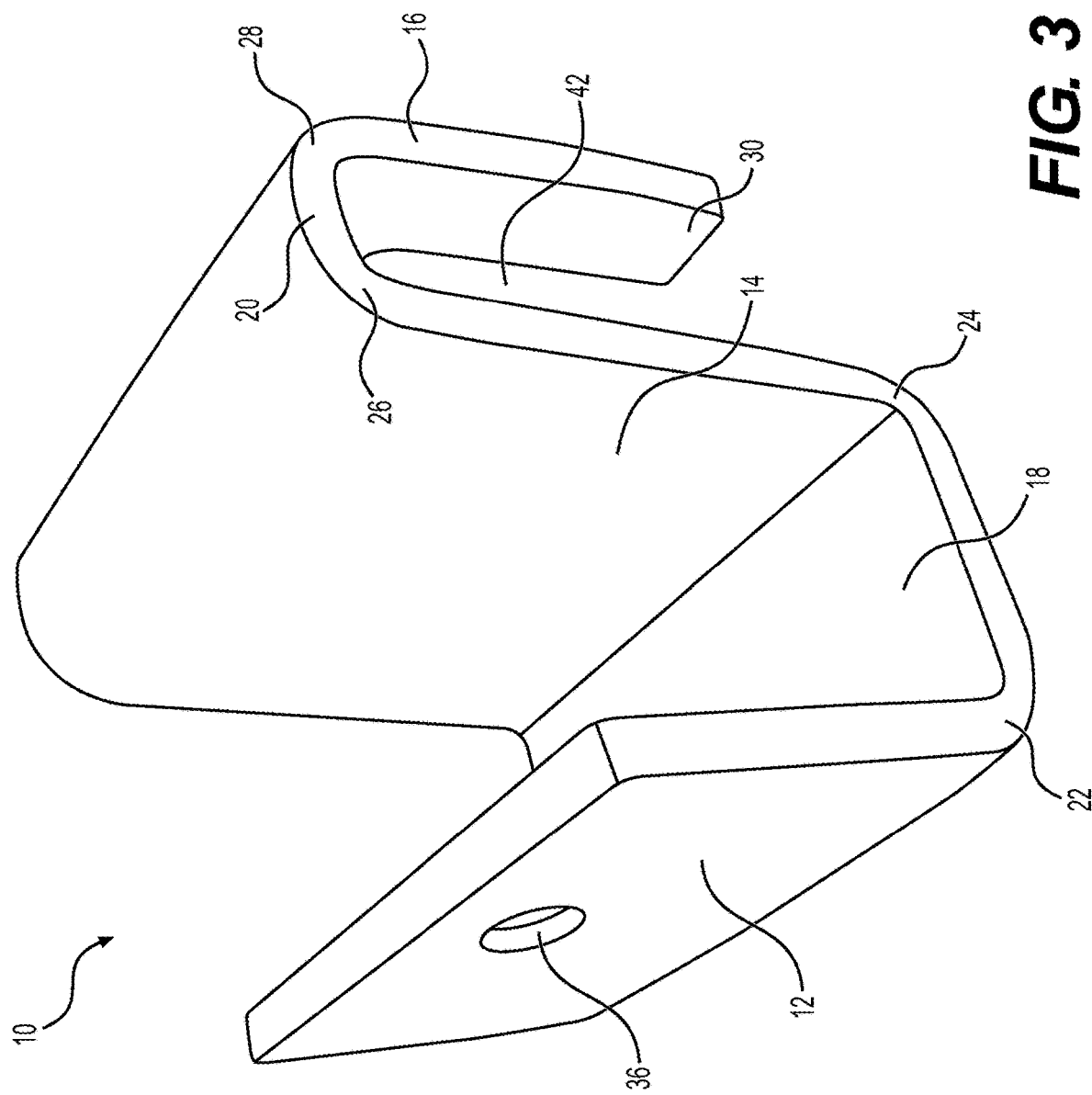
FIG. 3 is a bottom back perspective view of the key shown in FIG. 1.
Figure 4:
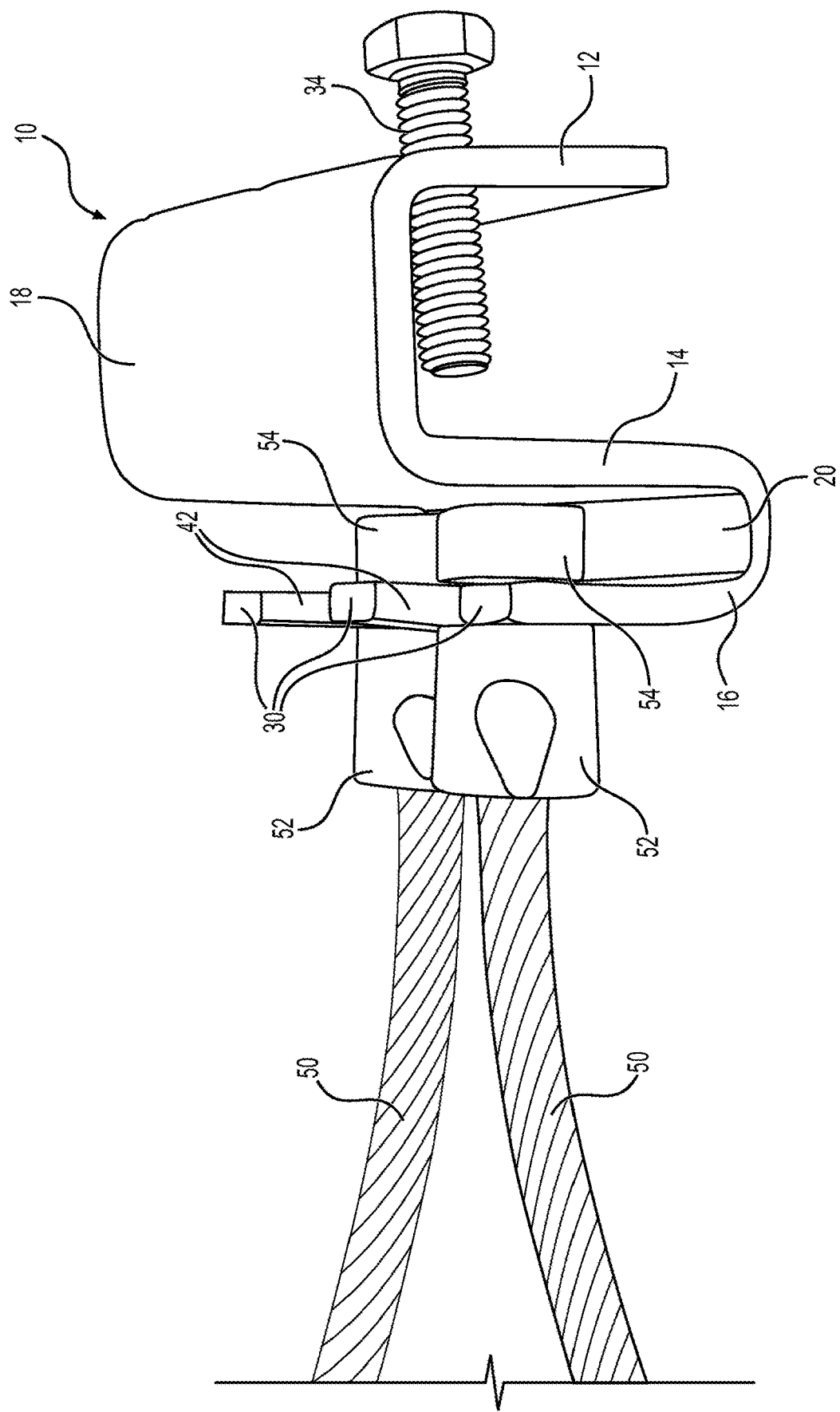
FIG. 4 is a top and side perspective view of the key shown in FIG. 1 with a cable and lugs mounted therein.
Figure 5:
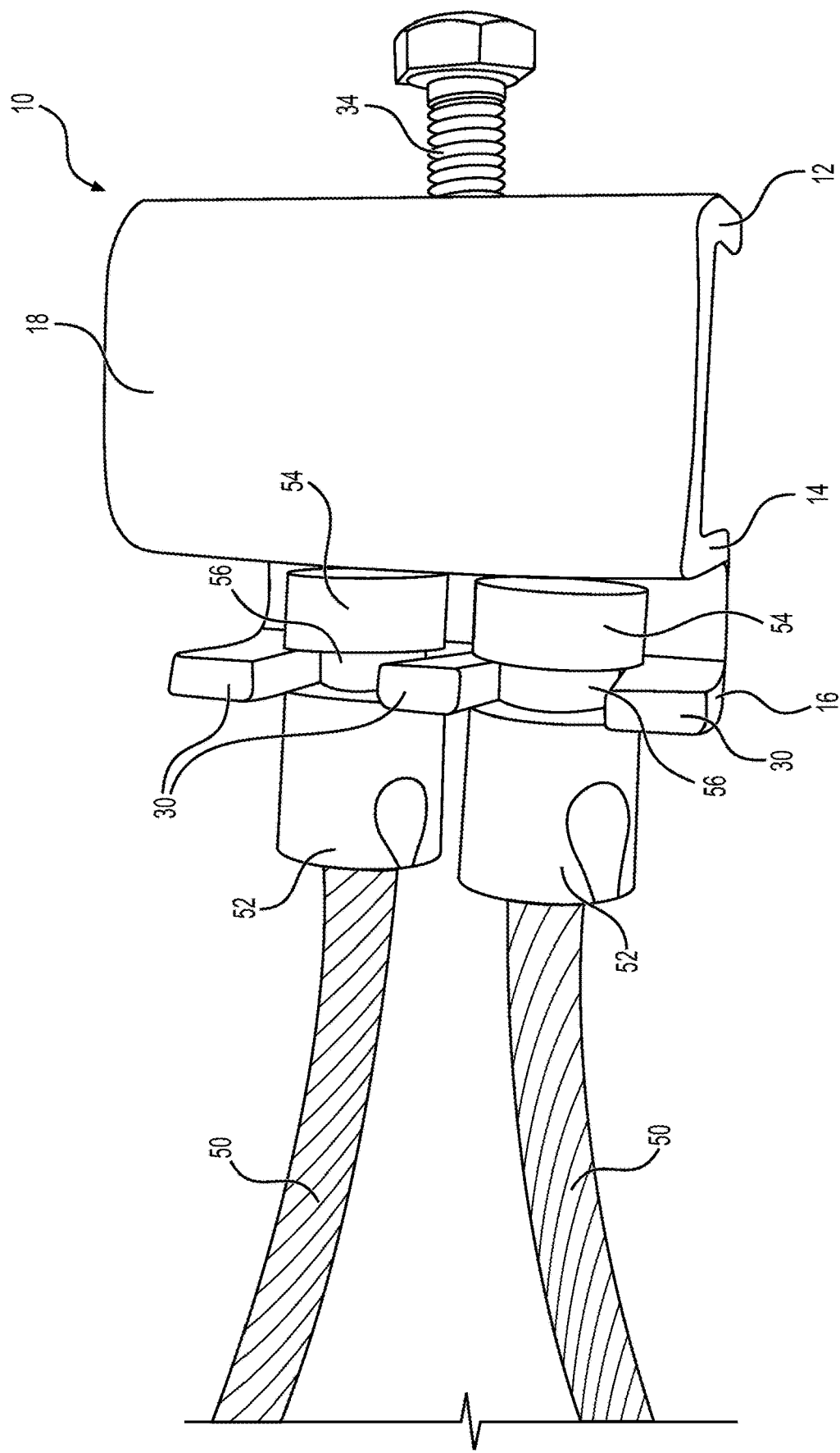
FIG. 5 is a top perspective view of the key shown in FIG. 1 with a cable and lugs mounted therein.
Figure 6:
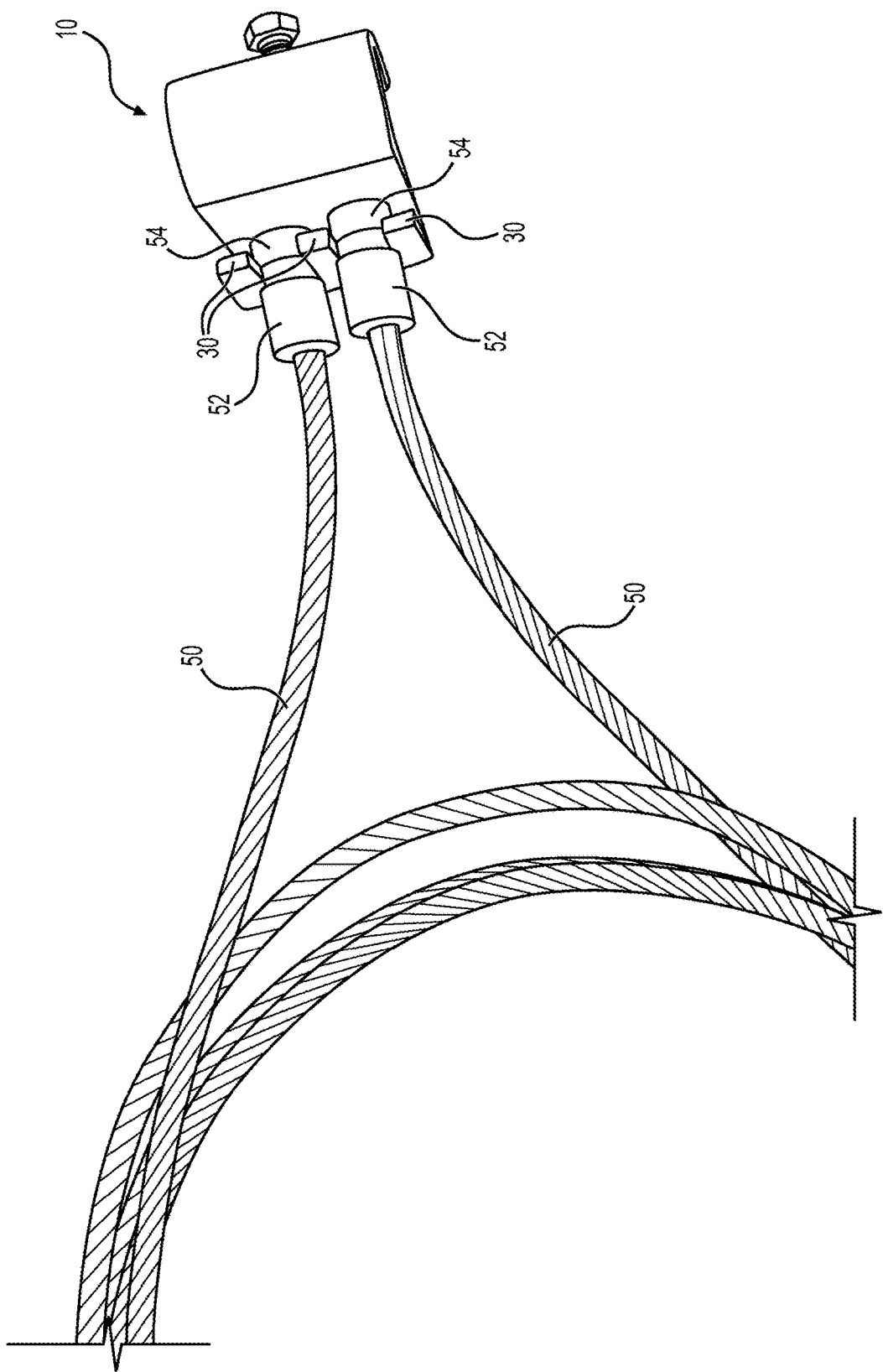
FIG. 6 is another top perspective view of the key shown in FIG. 1 with a cable and lugs mounted therein.

FIGS. 1-6 illustrate multiple views of a single example of key 10 in various views alone and in use with a lug-ended cable 50. FIG. 1 is a side perspective view of the key 10. FIG. 2 is a front perspective view of the key 10. FIG. 3 is an upside-down, rear perspective view of the key 10. FIG. 4 is a side perspective view of the key 10 with a cable 50 and lugs 52 positioned in the key. FIGS. 5 and 6 are top perspective views of the key 10 with the cable 50 and lugs 52 in the key.

More specifically now, the key 10 has a back wall 12, a middle wall 14 and a front wall 16. In between the back wall 12 and middle wall 14 is a top wall 18 that connects the back and middle walls. Top wall 18 should be substantially perpendicular to the face of middle wall 14 to allow key 10 to fit closely to the contour of the top of the toolbox allowing the toolbox lid to rest over the outside face of the top of the toolbox and key 10. In use, the top wall 18 will be on the top side of both the back wall 12 and middle wall 14. The top wall 18 is connected with approximately 90-degree angles 22 and 24 to each of the respective back wall 12 and middle wall 14. As shown in the figures, the angle between the back wall 12 and top wall 18 is slightly larger than 90 degrees. The result of the connection between the top wall 18 and the back wall 12 and middle wall 14 is to create an upside-down U-shape. The shape of the turn, whether U-shaped, right angles, or otherwise, is irrelevant to the function of the key The first distance 32 between back wall 12 and middle wall 14 is enough that the key 10 can be positioned over a box top edge such as a truck storage or tool box top edge of varying thickness. The back wall 12 has a tightening bolt 34 that is positioned in threaded through-hole 36 that may be tightened to secure the key 10 to a box wall.

Middle wall 14 and front wall 16 are connected on their respective bottom edges by bottom wall 20. The middle wall 14 and front wall 16 are connected to each other at approximately 90-degree angles 26 and 28 respectively to the bottom wall 20 and thereby form an upward U-shape. The overall shape of the key 10 is therefore a sideways S-shape. The front wall 16, in this example, is comprised of three fingers 30 that face upwardly and that form slots 42 therebetween. The slots 42 have widths 40. The second distance 30 is the distance between the middle wall 14 and front wall 16. The gap defined by second distance 30 is wide enough to receive the lip of a box.

FIGS. 4-6 illustrate the key 10 as used in connection with cable 50 and lugs 52. The cable 50 is shown as a braided steel cable. It may also be a rope or chain or other cable composition that can wind through or around various objects that a user wants to secure in their truck bed or cargo area. The cable 50 has lugs 52 clamped or stamped or otherwise secured to the ends of the cable. Each lug 52 has an end block 54 and a cross-sectional groove 56 around it. In this example, the lug 52 has a circular cross-section. The end block 54 is sized to fit in the slots 42 between the fingers 30 and also in the space between the middle wall 14 and front wall 16. The end blocks 54 have a cross-sectional width that is greater than the width 40 that is the open width of the slots 42. In this way, the lugs 52 may slide into the slots 42 through the grooves 56 and be retained between the fingers 30 by the end blocks 54.

Before turning to the additional figures, several aspects of the first drawings are needed. First, the key 10 can be formed of any durable and tough metallic or composite material. Steel is a preferred material, and especially stainless steel because of the outdoor exposure are preferred. In the example of a formed contoured key, the steel may have a thickness of ⅟₁₆" to ¼", or alternatively ⅛" to ³⁄₁₆", or still further alternatively 12 gauge to 6 gauge, or 11 gauge to 7 gauge. Also, the example of the key 10 in FIGS. 1-6 is shown with three fingers. A key may have only two fingers that form a single slot there between. For instance, one end of a cable may be anchored elsewhere to a truck body or truck box with only one slot required for a single lug on the free end of the cable. Additionally, there may be four or more fingers (three or more slots) to anchor multiple cables with the key. Also, as especially shown in FIG. 6, the cable 50 may be a single cable connected on both ends in the key. Alternatively, the cable 50 as shown could represent two different cables that are connected on only one end in the key and on the opposite end to a truck body or box.

Figure 7:
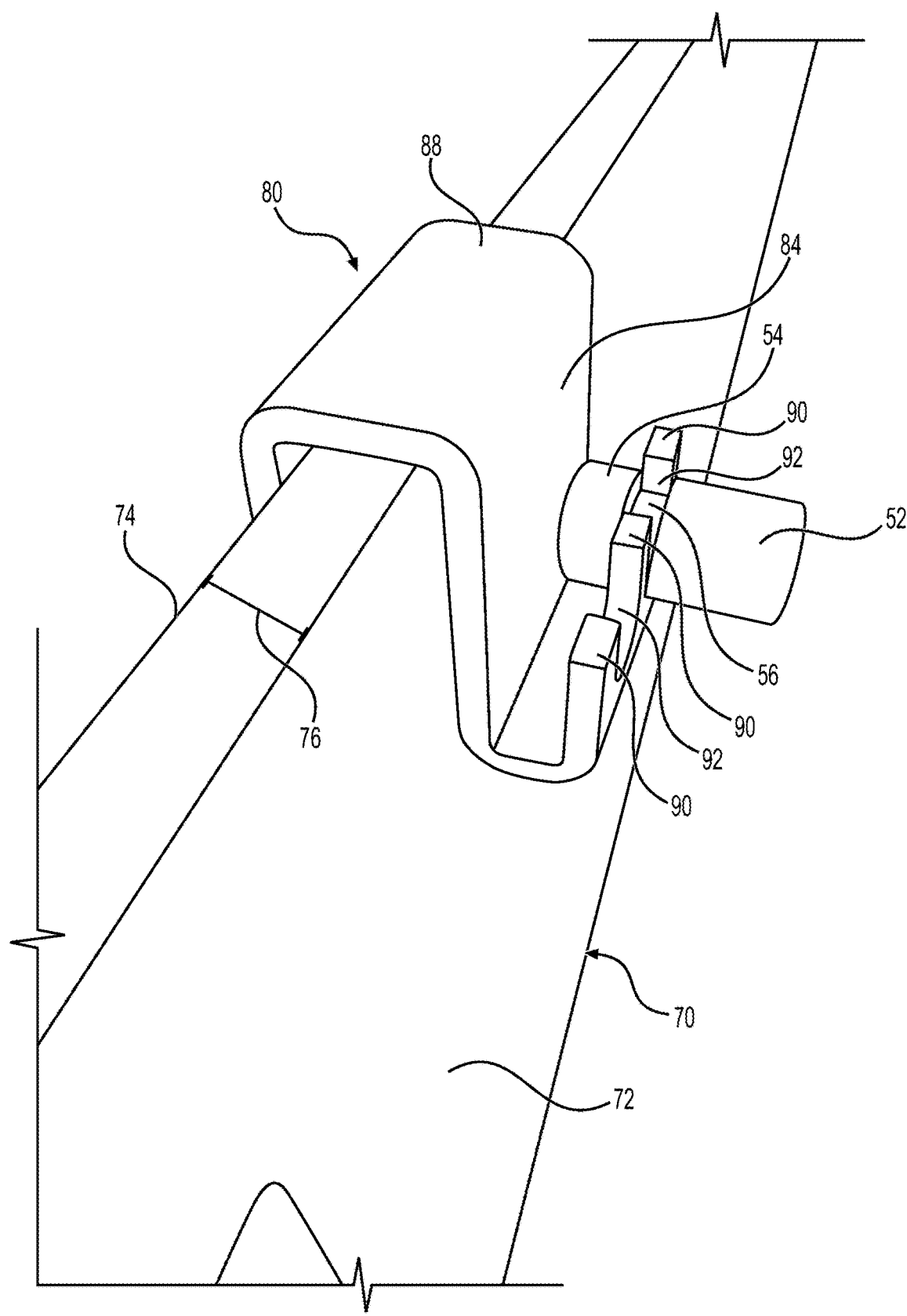
FIG. 7 is a perspective view of a second example of a key as described herein with the key mounted on a truck box wall.
Figure 8:
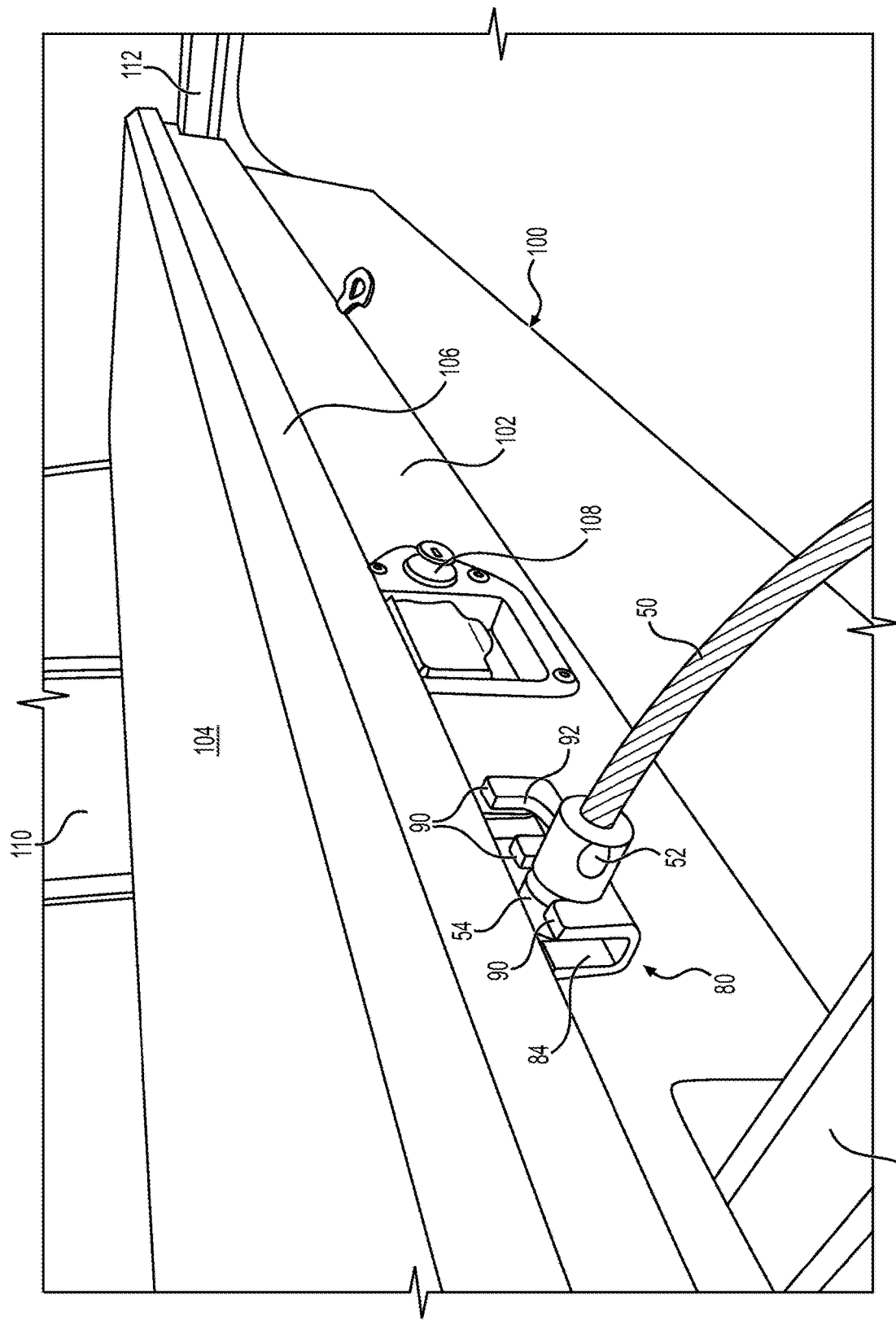
FIG. 8 is a perspective view of the key shown in FIG. 7 with the truck box lid in the down and closed position over the key.

FIGS. 7 and 8 illustrate a second example of a key 80 as described herein. The key 80 is shown in two different settings. In FIG. 7, the key 80 is positioned on the top lip of the front side of wall 72 of a storage truck box 70. The storage box 70 has a front side 72 and a back side 74. The thickness 76 of the box wall 72 is shown as less that the length of the top wall 88 of the key 80. This allows the key 80 to rest on the wall 72. Although not shown in FIG. 7 or 8, a screw like screw 34 in FIG. 1 can be used to tighten and secure the key 80 to the wall 72.

The key 80 has fingers 90 that define slots 92. A lug 52 is shown positioned in a slot 92 by sliding the lug groove 56 in between the fingers 90 with the lug end block 54 retaining the lug 52 in the slot. It is visually apparent here that the fingers 90 are shorter than the fingers 30 shown in FIGS. 1-6.

This is an alternative example of how the key may be locked with the closing of a truck box lid. In FIG. 8, there is a truck box 100 with a front face wall 102, a top 104 and an overlapping lid 106 portion of the top. The overlapping lid comes over and outside the middle wall 84 but only part way down the middle wall. However, the overlapping lid 106 extends down and blocks some space between the fingers 90 and the middle wall 84. In this way, the end block 54 on the lug 52 is prevented from sliding upwardly and out of slot 92. When the lid 106 is locked down by box lock 108, then the end of cable 50 is locked in place in the key 80. The fingers in FIGS. 1-6 and also like in FIG. 9 are longer and the overlapping lid will extend down further in between to secure the end block of a lug in the given key.

FIG. 8 provides a more environmental views in that the key 80 on box 100 is mounted across the back of a pickup truck 110 and specifically on the sidewalls 112 of the bed of the truck. The truck box might alternatively be mounted on a single sidewall only of a truck bed.

Figure 9:
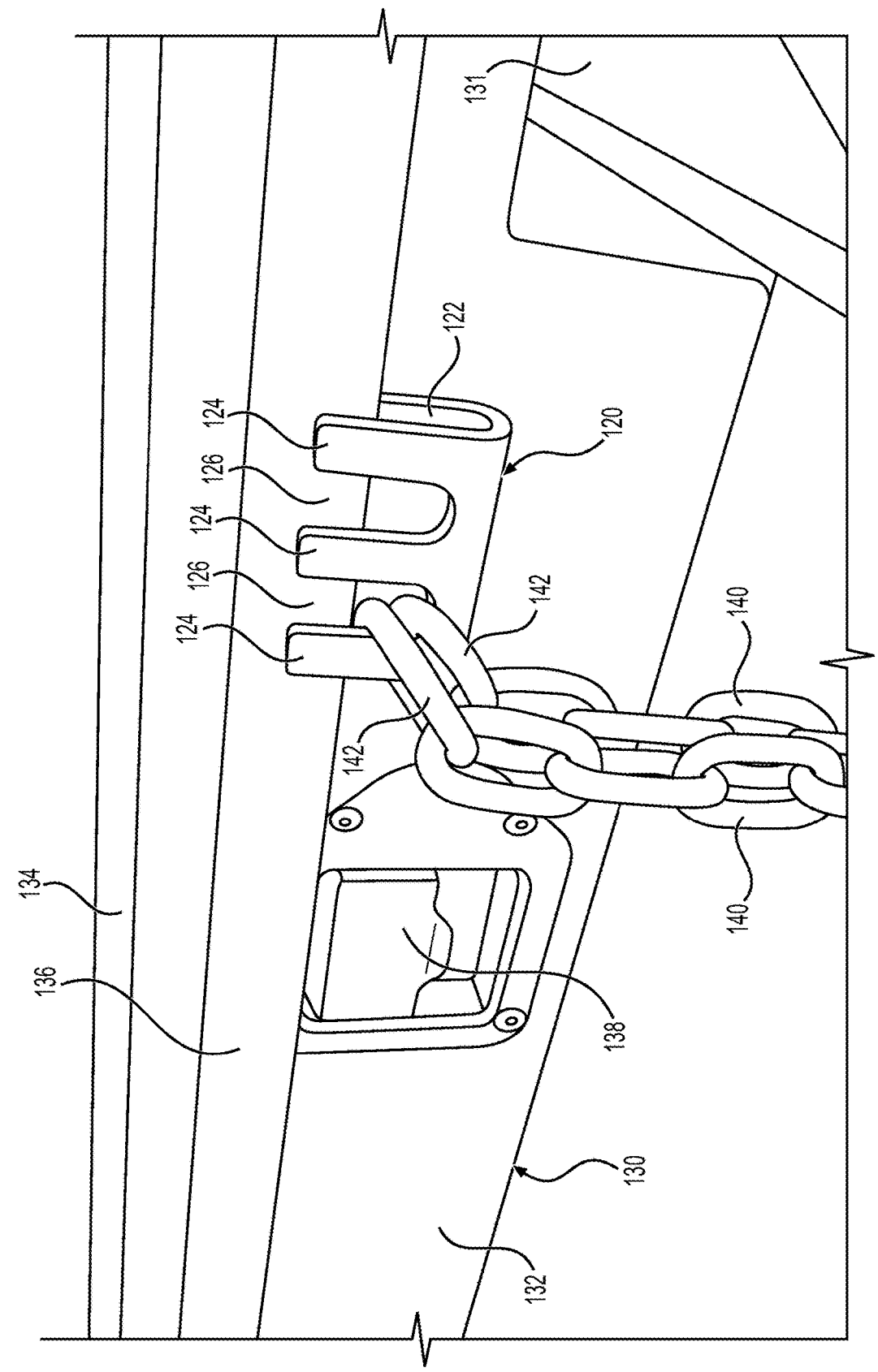
FIGS. 9-11 illustrate a third example of a key shown mounted and locked on the top edge of a box with the lid closed with two chain links mounted on a single finger (FIG. 9), two chain links mounted on two different fingers spaced at each end (FIG. 10), and two chain links mounted on separate but adjacent fingers (FIG. 11).
Figure 10:
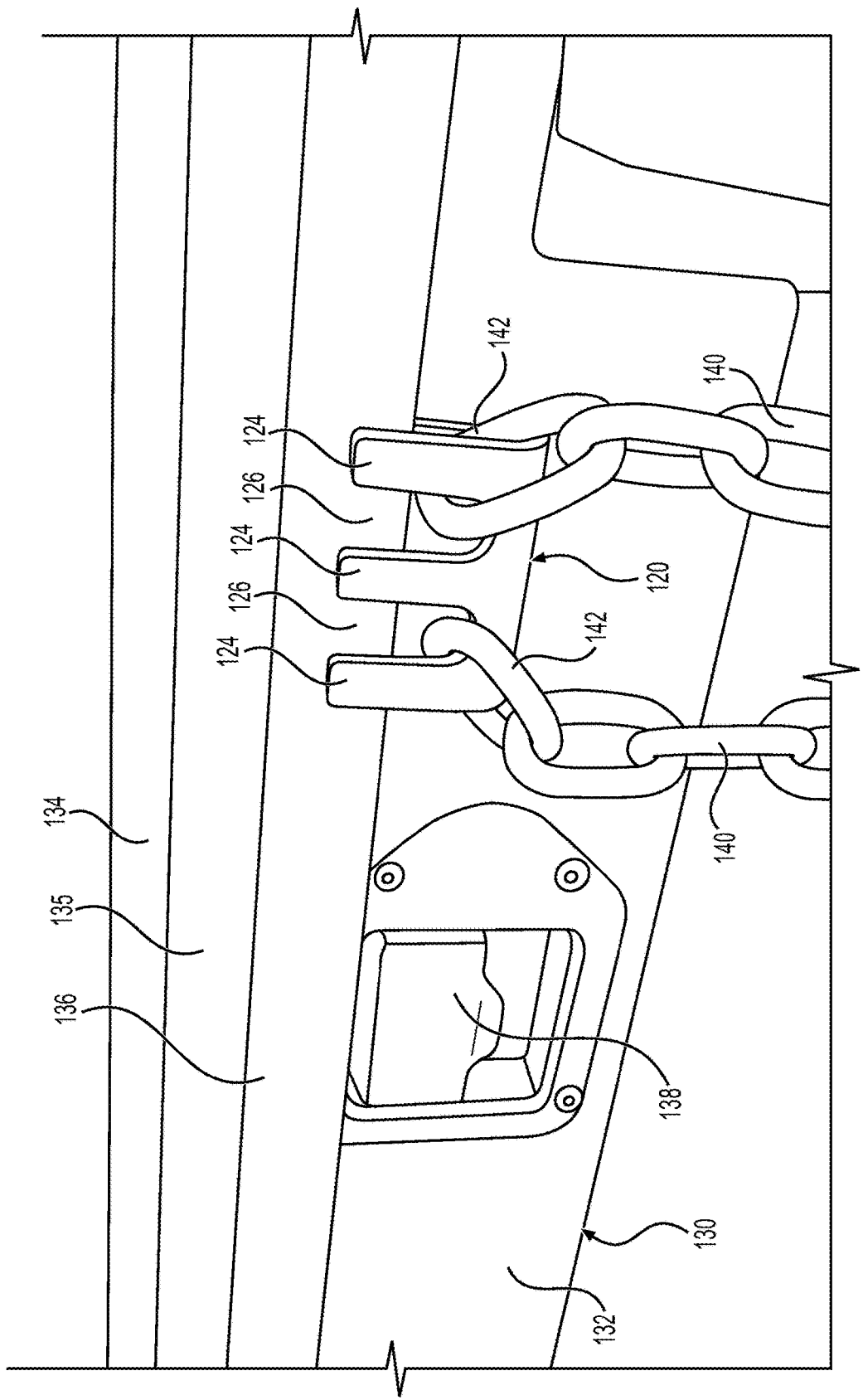
Figure 11:
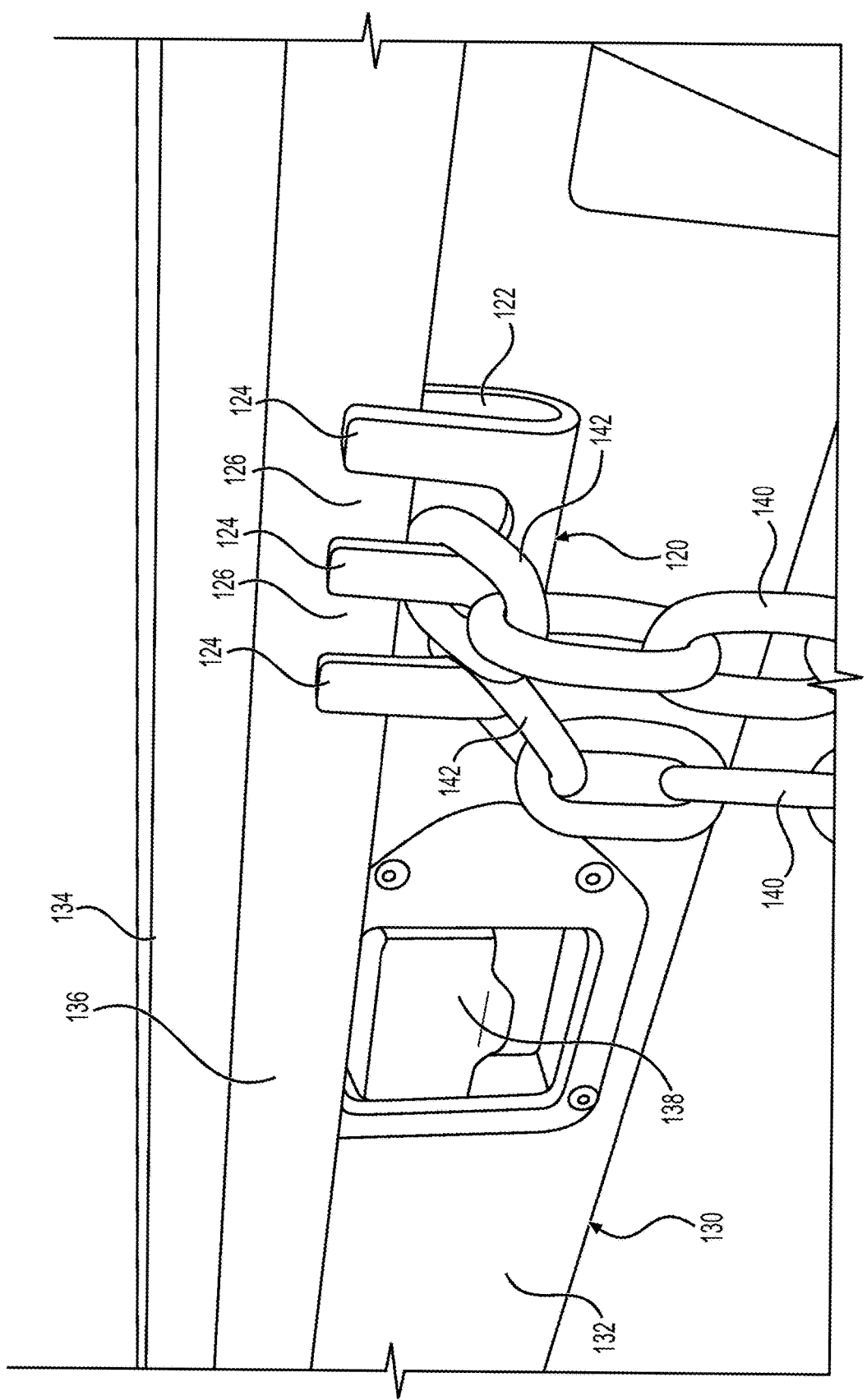

FIGS. 9-11 are alternative views of a chain 140 (instead of the cable earlier) is locked in key 120. Two chains 140 are shown. These chains 140 may be opposite ends of the same chain or alternatively simply one end each of two different chains that might be secured on their other end elsewhere in a truck bed. The key 120 has relatively longer fingers 124 (as compared with fingers 90 in FIGS. 7 and 8) that define slots 126. Instead of a lug, the key fingers 124 act as small posts that chain links 142 may loop over. Chain links 142 are shown as the end links in a length of one or two chains, but any links in chain 140 may loop over the fingers 124.

In FIGS. 9-11, the key 120 has a middle wall 122 that is mounted over and against the box front wall 132. The front of the key 120 has three fingers 124 that define a pair of slots 126. The top side and back wall of the key 120 are not shown, but they are mounted on and behind the front wall 132 of the truck box 130. The links 142 of chain 140 are mounted over a single finger 124 (both chain links, FIG. 9), the two links mounted one each over the outside fingers (FIG. 10 and on adjacent fingers (FIG. 11). The truck box 130 has a front wall 132, a top 134, and an overlapping lid 136 that slides partially between the back of fingers 124 and the middle wall 122 of the key 120. This overlapping lid 136 secures the chain links 142 over the fingers 124. Some truck boxes have a substantially flat and horizontal top connected at about 90 degrees to an overlapping lid portion. This is not shown here. Instead, the box 130 has a horizontal flat top 134, a beveled corner portion 135 and the vertical overlapping lid portion 136 that extends downwardly and in between the middle wall 122 and the fingers 124. The top 134 is secured down onto the front face 132 by a latch/lock 138.

It is readily apparent that the height of a middle wall of a key and the height of the upward fingers may vary depending on the actual dimensions of various manufacturers of truck boxes and the size/height of the overlapping lid portions of the lids and also the chosen shape and dimension of the lug on the end of the cable In the drawing the lug is ¾" roundbar that is 1⅜" in height with a top with a ⅛" groove that is ¼" wide leaving ⅜" of material at the tip of the lug to be captured by the bracket. A range of heights of the middle wall and fingers includes the following. The length of the middle wall is from ½" to 2 and 5/16 inches, or alternatively 1 to 2 inches. The width of the space between the middle wall and front face/fingers of a key ranges from ¼" to ¾" inches, or alternatively 1/16" to ⅞" inches. The height of the fingers may range from ½" to 2 and 5/16 inches, or alternatively 1 to 2 inches, as measured from the bottom of a front face.

Figure 12:
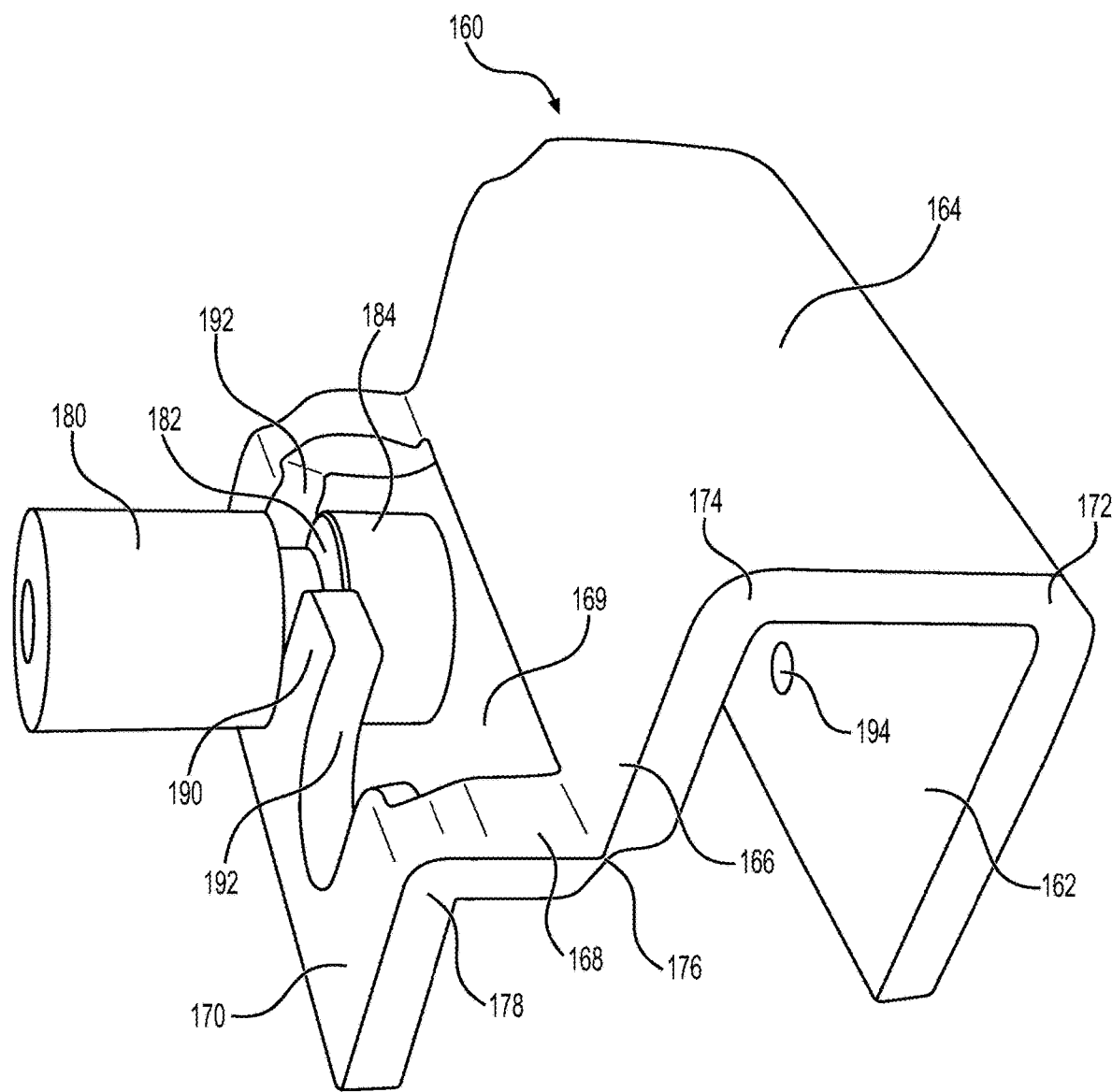
FIG. 12 is a perspective view of a third example of a key as described herein.
Figure 13A:
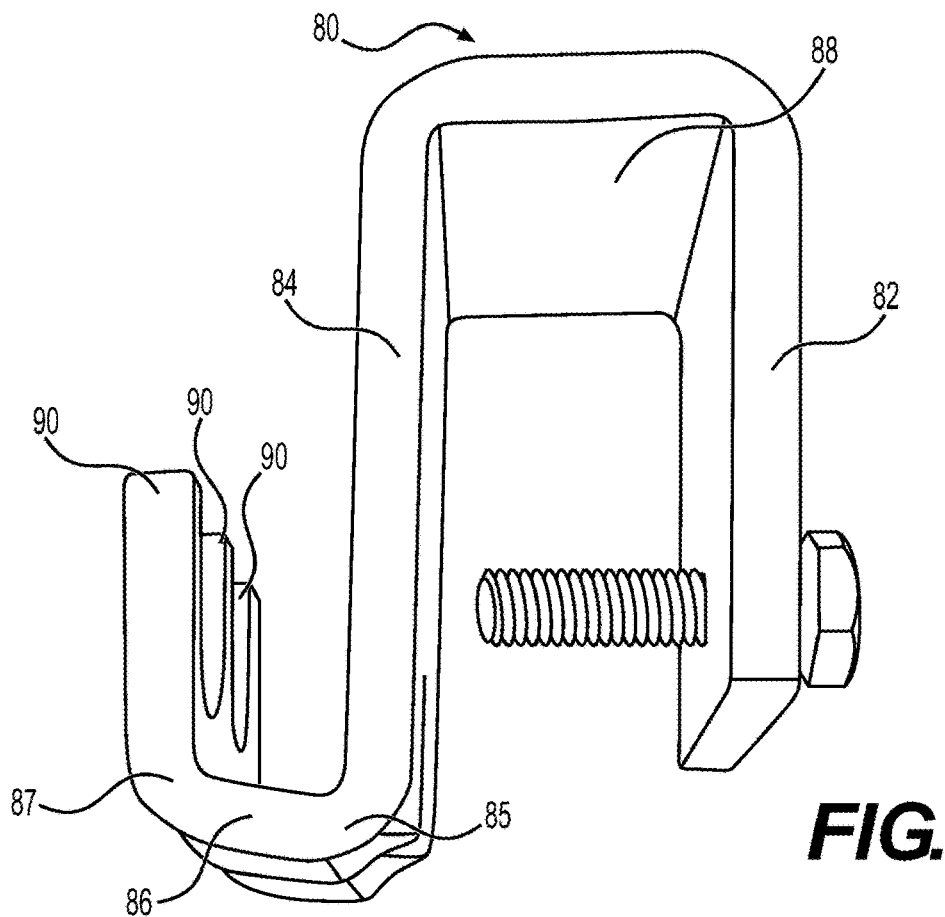
FIGS. 13A and 13B are comparative side perspective views of fourth and fifth examples of keys as described herein.

FIGS. 12, 13A and B, and 14 illustrate an alternative shape of a key with a front face and integral fingers and slots as compared with the upwardly extending fingers and slots in keys 10 and 80 discussed earlier. Key 160 includes a back wall 162, a middle wall 166 and a front wall 170 The back wall 162 is connected at its top to middle wall 166. There are two, substantially 90-degree curves 172 and 174 that connect the tops of inside and middle walls 162 and 166 so that there is an upside-down U-shape formed. The middle wall 166, instead of being approximately the same height/length as the inside wall 162, is approximately half of the height of the inside wall. At the bottom of the middle wall 166, there is a 90-degree curve 176 that connects to a flat shoulder 168. This shoulder 168 is connected on its opposite side to a downwardly depending extension wall 170 by a 90-degree corner 178. The front wall has two slots 192 formed therein and separated by a single finger 190. As shown, the flat shoulder 168 has an open space 169 therein. The open space 169 allows for a lug 180, and specifically the groove 182 to slide in the slot 192. And end block 184 of the lug 180 prevents the lug from being able to be pulled out from the slot 192. In operation, the back wall 162 is mounted over a box top edge and possibly tightened in place by a set screw like screw 34 shown in FIG. 1. An overlapping lid portion of a box may be closed wither resting on the shoulder 168 or latching down near to it. This lid would then prevent a lug or chain link from being removed from the slot.

Figure 13B:
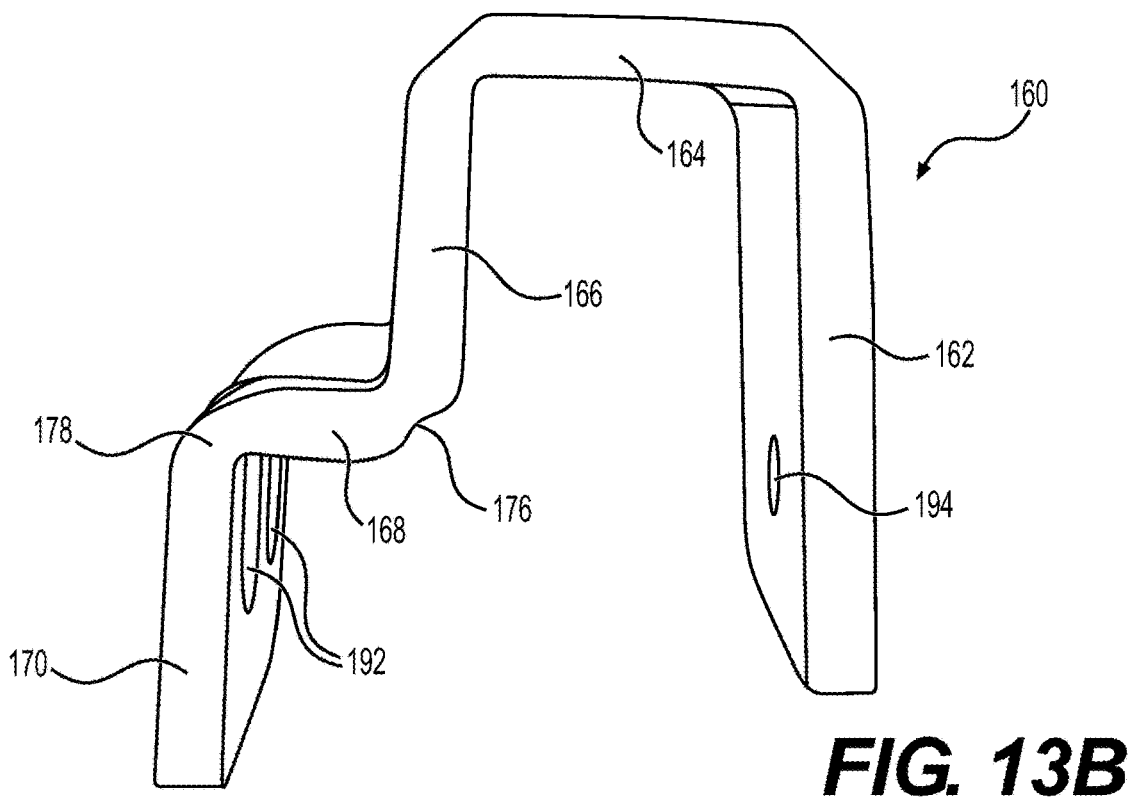
Figure 14:
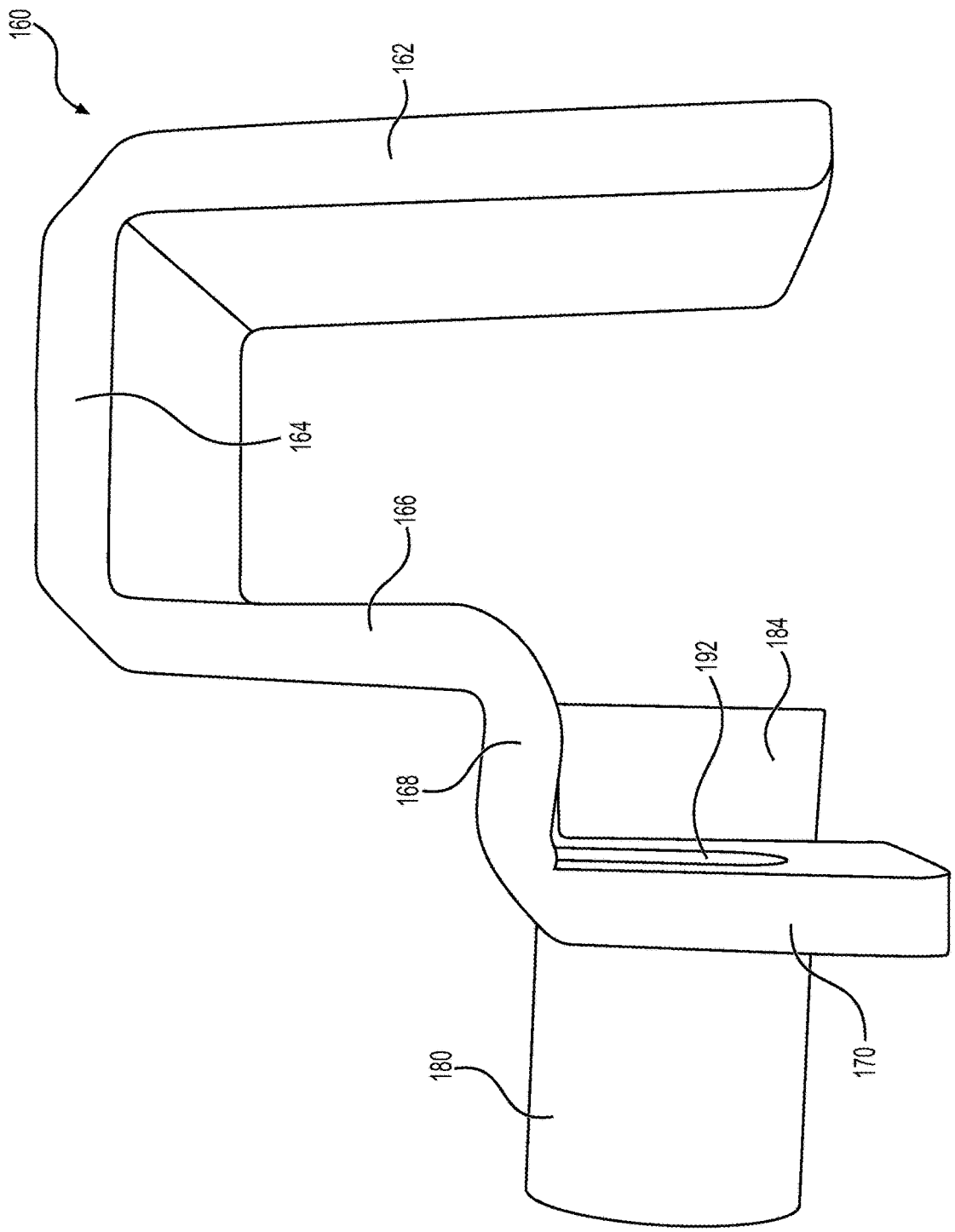
FIG. 14 is a side perspective view of a still further example of a key as described herein.

FIGS. 13A and 13B are merely a side-by-side comparison of the two different key styles described. FIG. 13A illustrates again the key 80 with a back wall 82, top wall 88, middle wall 84 bottom wall 86 and front fingers 90. Relatively speaking, the fingers are shorter than the fingers of FIG. 1 for instance.

The embodiment shown in FIG. 12 is an alternative in design than FIGS. 1 and 2. FIG. 12 is limited to a specific dimension of a toolbox in relation to the length/height of wall 166. FIG. 1 allows for the lug to be secured in the slot across a broader range of heights for the toolbox lid. In FIG. 1, the slots only need to be long enough to have the lug/chain rest at the bottom and allow enough space for the toolbox lid to close. Face 16 must be long enough to prevent removal but can be any length longer. FIG. 1 functions across several toolbox lid heights that are found among the different manufacturers. Therefore, different toolbox lids will have different distances between the lug and the bottom face of the lid, but all secure the lug in the key. FIG. 12 cannot function across significant changes to the height of the toolbox lid. With shoulder 168 turning away from wall 166, shoulder 168 holds the lug in a place not allowing the lug to move within the slot. Making the slots longer would serve no purpose. The length of wall 166 would only offer a small range, less than half the diameter of the lug, of toolbox heights in which the lug will remain secured.

Figure 15:
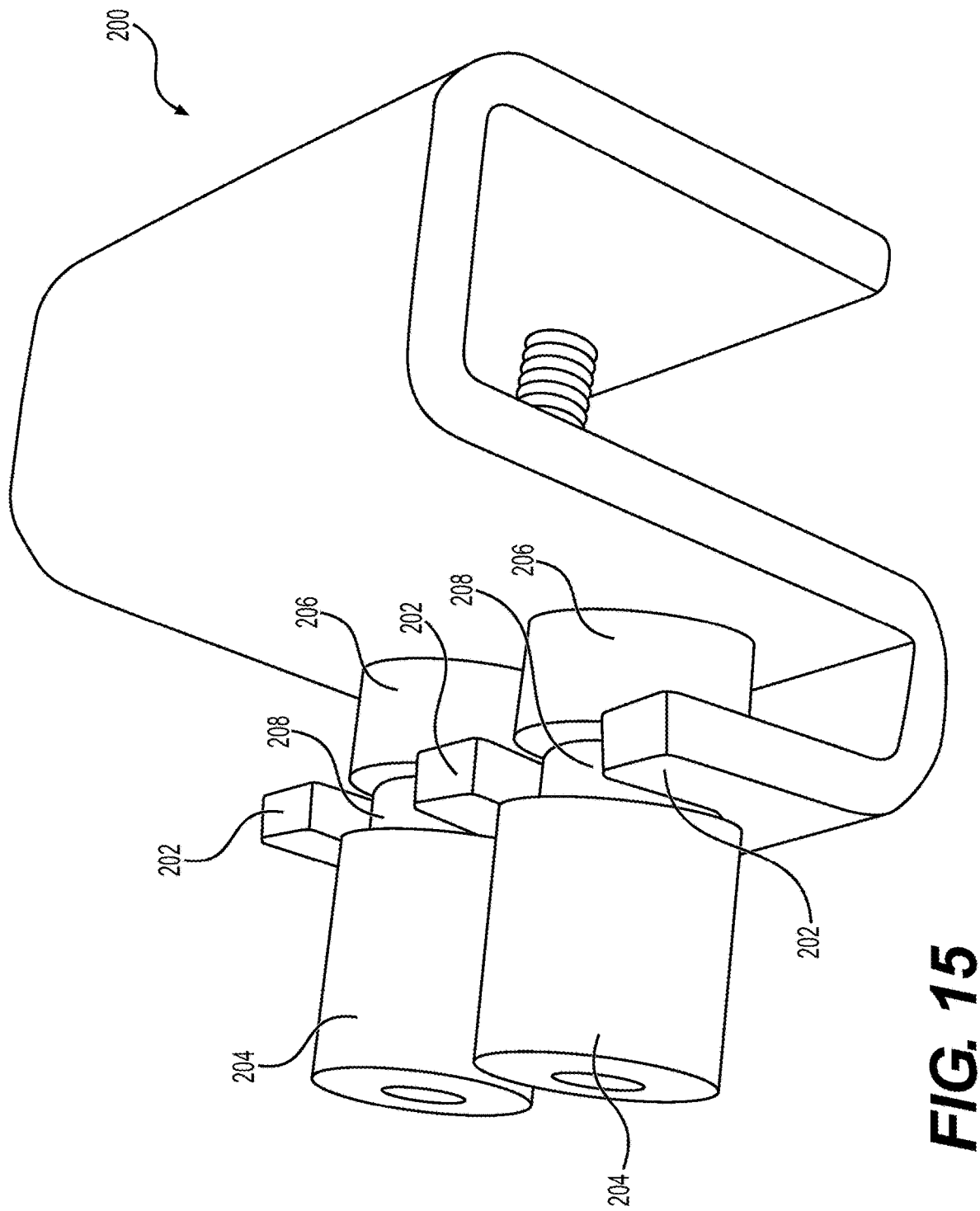
FIG. 15 is a perspective view of another example of a key as described herein.
Figure 16:
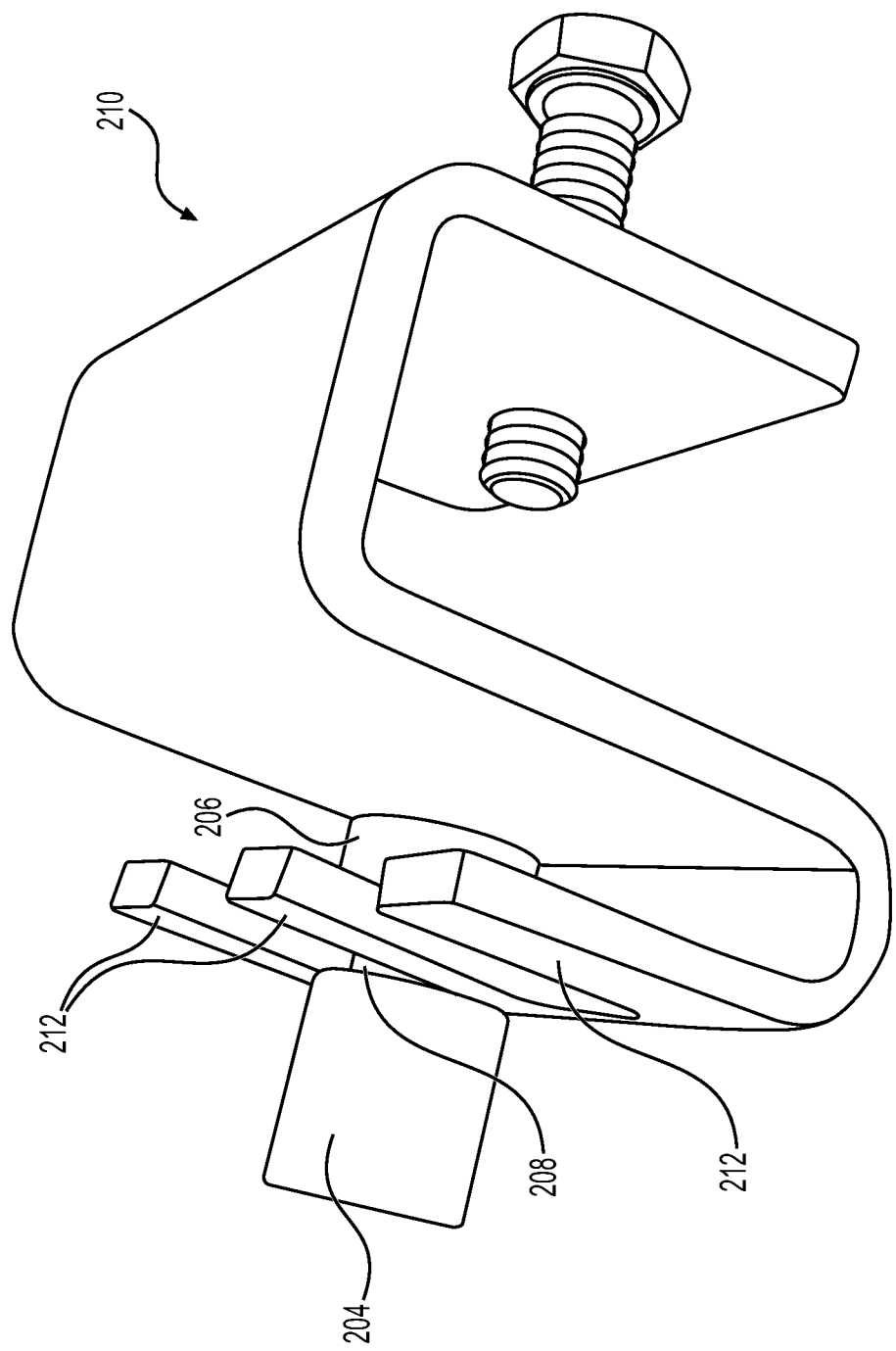
FIG. 16 is a perspective view of another example of a key as described herein.

FIGS. 15 and 16 illustrate the relatively short fingers 202 of key 200 in FIG. 15 as compared with the relatively longer fingers 212 of key 210 in FIG. 16. As can be seen, the lugs 204 will slide further down in between fingers 212 than between fingers 202. The size of the groove 208 and the end block 206 does not change in the comparative figures.

FIG. 17 illustrates two alternative shape lugs 220 and 230. Lug 220 is similar to those shown earlier having a cylindrical shape and circular cross-section including a groove 226 and end block 222. Lug 230 is a rectangular box with a square cross-section including a square groove 236 and square cross-section end block 230. Each of the lugs 220 and 230 may be adapted to fit into a similar sized slot on a key. Of course other shaped lugs may be formed to fit into the key slots.

Figure 18:
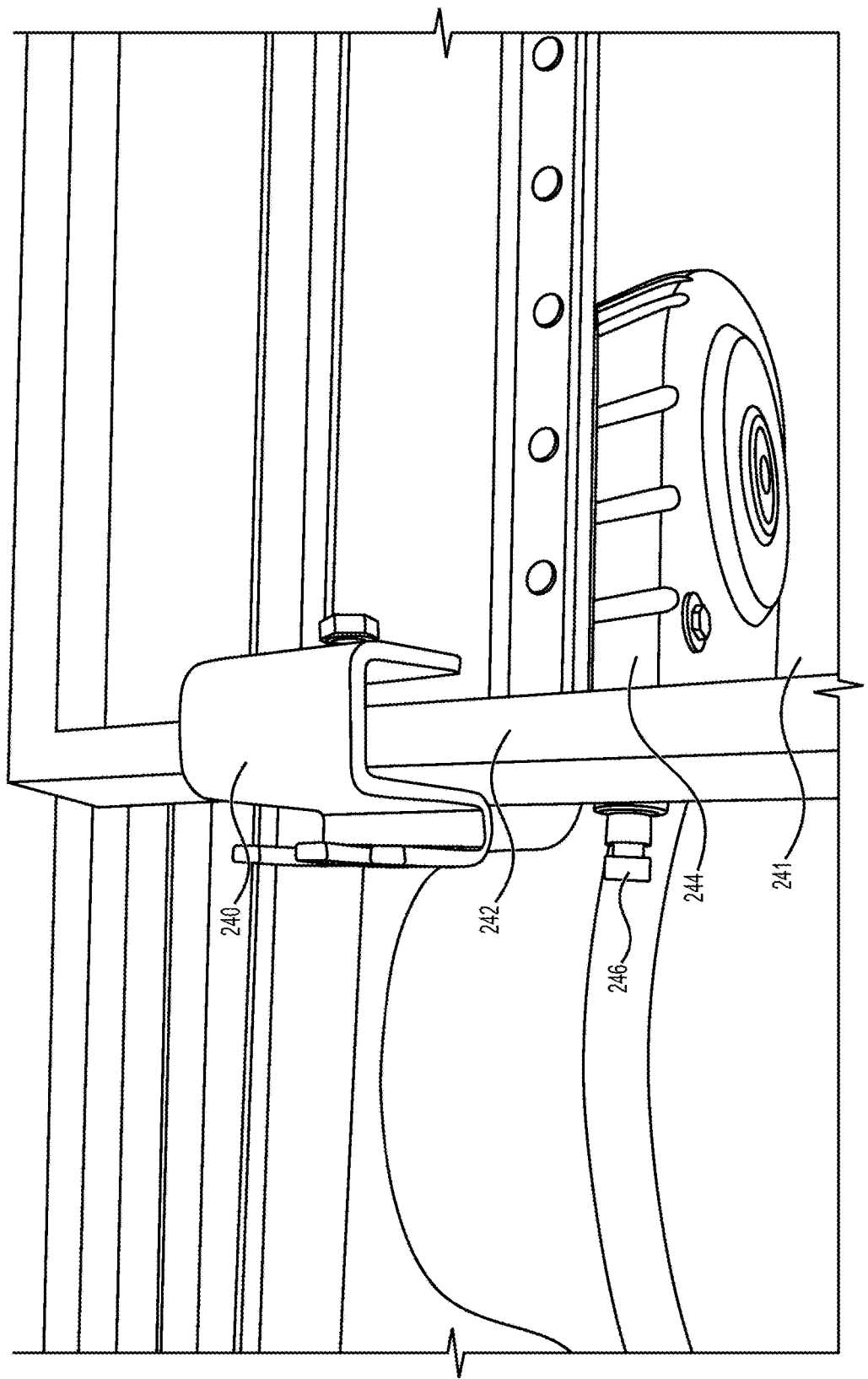
FIG. 18 is a perspective view of the inside of a truck box with a cable spool mounted therein and the lug end of a cable extending therefrom.

FIG. 18 shows a locking key 240 mounted on the top edge of front wall 242 of a toolbox 241. Mounted inside the box 241 is a spool 244 of cable that may be pulled from the spool. The end of the cable is lug 246 that is accessible on the outside of front wall 242. When spool 244 is a retractable spool as shown, then a user may grab the lug 246 and extend it through the wall 242 and use it to wind around or through an object and then have the lug locked into place in the key 240 upon closing a lid of the toolbox 241. When not in use, the cable retracts into the spool 244 as shown and only the lug 246 is seen.

Figure 19:
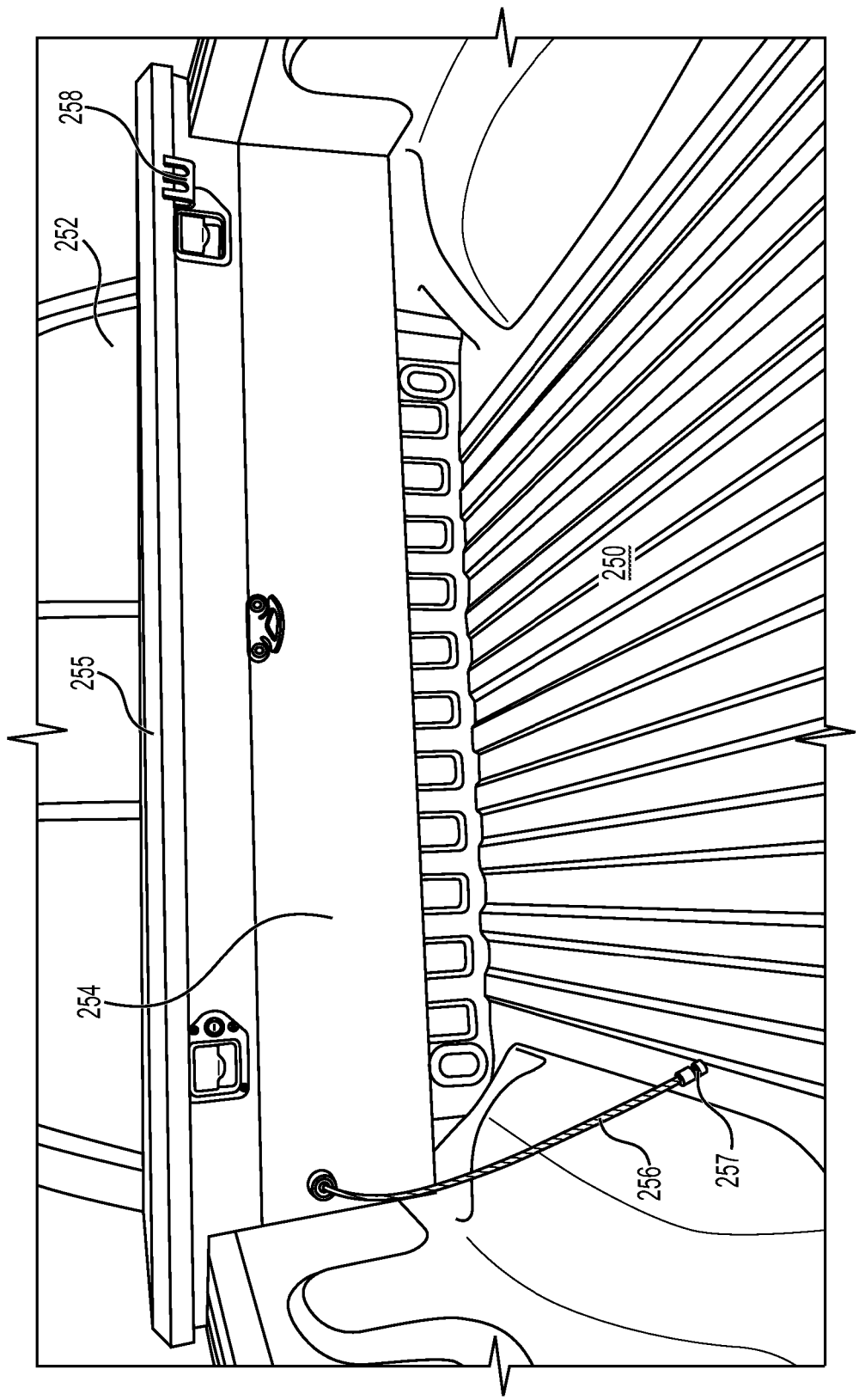
FIG. 19 is a perspective view of a toolbox mounted in the bed of a truck with a cable extending from the toolbox and a contoured key mounted on the top of the front wall of the toolbox.

FIG. 19 illustrates a toolbox 254 mounted over the truck bed 250 in a pickup truck. The toolbox 254 is mounted over the bed 250 adjacent the cab 252 of the truck. The toolbox 254 has a cable 256 and lug 257 extending from a hole in the toolbox and is adapted to be locked into the key 258 locked in place by the lid 255 over the front wall of the toolbox.

Other embodiments of the present invention will be apparent to those skilled in the art from consideration of the specification. It is intended that the specification and figures be considered as exemplary only, with a true scope and spirit of the invention being indicated by the following claims.

That which is claimed is:

1. A cable locking system for use with vehicles having a toolbox, the system comprising: a vehicle having a cargo bed defined by three sides, a floor and a tailgate, wherein the
   cargo bed has a toolbox mounted on a side of the cargo bed and the toolbox having a lid with rotating open up and latched down positions, and the toolbox having a front body and at least three sidewalls the toolbox lid rotatably attached to a toolbox sidewall wherein the toolbox lid rotates into the latched position when the lid is closed onto a front face of the toolbox front body;
   a length of cable having a first end of the cable, and a second end of the cable that is fixed to the cargo bed or toolbox;
   a lug fixed onto the first end of the cable, and the lug having a groove across its width and an end block having a diameter greater than a diameter of the groove;
   an S-shaped contoured key formed by two approximately 180 degree turns and adapted to hook over a top of the toolbox front body and having an open slot that is sized to laterally slide across the lug groove and wherein the end block is too large to perpendicularly come out of the slot; and
   further wherein the contoured key fits into the empty space between the closed toolbox lid and the toolbox front body that the contoured key is attached to;
   whereby when the cable and the lug are inserted into the key, the key and lug are locked when the toolbox is closed.

2. A cable locking system for use with vehicles having a toolbox as described in claim 1, wherein the cable is wound on a retractable spool that is fixed inside the toolbox.

3. A cable locking system for use with vehicles having a toolbox as described in claim 1, wherein the cable is fixed inside the toolbox.

4. A cable locking system for use with vehicles having a toolbox as described in claim 1, wherein the lug is round in cross-section.

5. A cable locking system for use with vehicles having a toolbox as described in claim 1, wherein the lug is rectangular in cross-section.

6. A cable locking system for use with vehicles having a toolbox as described in claim 1, wherein a second end of the contoured key is fixed to the inside toolbox face by a screw.

7. A cable locking system for use with vehicles having a toolbox as described in claim 1, wherein a first end of the contoured key is offset from the face of the front toolbox body.

8. A cable locking system for use with vehicles having a toolbox, the system comprising: a toolbox adapted to be mounted on the cargo bed of a truck, and the toolbox having a lid with rotating open up, and latched down positions, and the toolbox having a front body and at least three sidewalls the toolbox lid rotatably attached to a toolbox sidewall wherein the toolbox lid rotates into the latched position when the lid is closed onto a front face of the toolbox front body;
   a length of cable having a first end of the cable, and a second end of the cable that is fixed to the toolbox;
   a lug fixed onto the first end of the cable, and the lug having a groove across its width and an end block having a diameter greater than a diameter of the groove;
   an S-shaped contoured key formed by two approximately 180 degree turns and adapted to hook over a top of the toolbox front body and having an open slot that is sized to laterally slide across the lug groove and wherein the end block is too large to perpendicularly come out of the slot; and
   further wherein the contoured key fits into the empty space between the closed toolbox lid and the toolbox front body that the contoured key is attached to;
   whereby when the cable and the lug are inserted into the key, the key and lug are locked when the toolbox is closed.

9. A cable locking system for use with vehicles having a toolbox as described in claim 8, wherein the lug is round in cross-section.

10. A cable locking system for use with vehicles having a toolbox as described in claim 8, wherein the lug is rectangular in cross-section.

11. A cable locking system for use with vehicles having a toolbox as described in claim 8, wherein the cable is wound on a retractable spool that is fixed inside the toolbox.

12. A cable locking system for use with vehicles having a toolbox as described in claim 8, wherein the cable is fixed inside the tool box.

13. A cable locking system for use with vehicles having a toolbox as described in claim 8 wherein a second end of the S-shaped contoured key is fixed to the toolbox front face by a screw.

* * * * *